United States Patent
Guo et al.

(10) Patent No.: US 9,135,056 B2
(45) Date of Patent: *Sep. 15, 2015

(54) AUTOMATED, CONTROLLED DISTRIBUTION AND EXECUTION OF COMMANDS AND SCRIPTS

(75) Inventors: Shang Q. Guo, Cortlandt Manor, NY (US); Ramesh S. Palakodeti, Crystal Lake, IL (US); Rajeev Puri, Huntersville, NC (US); Daniela Rosu, Ossining, NY (US); Cashchakanithara Venugopal, Naperville, IL (US); Frederick Y. Wu, Greenwich, CT (US); Sai Zeng, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 392 days.

This patent is subject to a terminal disclaimer.

(21) Appl. No.: 13/592,067

(22) Filed: Aug. 22, 2012

(65) Prior Publication Data
US 2014/0053073 A1 Feb. 20, 2014

Related U.S. Application Data

(63) Continuation of application No. 13/589,585, filed on Aug. 20, 2012.

(51) Int. Cl.
*G06F 9/46* (2006.01)
*G06F 9/48* (2006.01)
*H04L 12/24* (2006.01)

(52) U.S. Cl.
CPC .............. *G06F 9/468* (2013.01); *G06F 9/4843* (2013.01); *H04L 41/22* (2013.01); *H04L 41/28* (2013.01)

(58) Field of Classification Search
CPC .......... G06F 9/468; H04L 41/28; H04L 41/22
USPC .......................................................... 726/27
See application file for complete search history.

(56) References Cited

U.S. PATENT DOCUMENTS 6,449,636 B1    9/2002   Kredo et al.
6,516,337 B1 *  2/2003   Tripp et al. ................... 709/202
(Continued)

OTHER PUBLICATIONS

Neto et al., MARTe: A Multiplatform Real-Time Framework, IEEE Transactions on Nuclear Science, Apr. 2010, vol. 57, No. 2, pp. 479-486.*

(Continued)

*Primary Examiner* — Kenneth Chang
(74) *Attorney, Agent, or Firm* — Scully, Scott, Murphy & Presser, P.C.; Louis J. Percello, Esq.

(57) ABSTRACT

Distributed execution of commands and scripts may comprise a script execution manager having access to a library of executable objects comprising at least one or more of commands or scripts or combination of commands and scripts. A script execution console may be operable to present a graphical user interface for selecting an executable object from the library to execute and for selecting one or more managed computers, on which to execute the selected executable object. The script execution console may be further operable to present a dynamically updated collation of results from execution of the selected executable object. One or more script execution agents may be operable to run on the selected respective one or more managed computers and further operable to communicate with the script execution manager.

22 Claims, 8 Drawing Sheets

(56) References Cited

U.S. PATENT DOCUMENTS

| | | |
|---|---|---|
| 7,308,464 B2 | 12/2007 | Nowitz et al. |
| 7,818,427 B2 | 10/2010 | Kacin et al. |
| 7,827,266 B2 | 11/2010 | Gupta |
| 2002/0100036 A1* | 7/2002 | Moshir et al. ............... 717/173 |
| 2003/0037177 A1* | 2/2003 | Sutton et al. ............... 709/316 |
| 2003/0163338 A1* | 8/2003 | Davis et al. ............... 705/1 |
| 2003/0226033 A1* | 12/2003 | Zinda et al. ............... 713/201 |
| 2003/0233547 A1* | 12/2003 | Gaston et al. ............... 713/168 |
| 2004/0111499 A1* | 6/2004 | Dobrowski et al. ........... 709/222 |
| 2005/0027687 A1 | 2/2005 | Nowitz et al. |
| 2005/0027841 A1* | 2/2005 | Rolfe ............... 709/223 |
| 2005/0138623 A1* | 6/2005 | Fresko ............... 718/102 |
| 2005/0234708 A1 | 10/2005 | Meehan et al. |
| 2006/0095971 A1* | 5/2006 | Costea et al. ............... 726/26 |
| 2007/0116241 A1* | 5/2007 | Flocken et al. ........... 379/265.05 |
| 2007/0226259 A1* | 9/2007 | Kacin et al. ............... 707/104.1 |
| 2007/0226736 A1* | 9/2007 | Johnson et al. ............... 718/1 |
| 2008/0127175 A1* | 5/2008 | Naranjo et al. ............... 717/174 |
| 2010/0281294 A1 | 11/2010 | Soulet et al. |

OTHER PUBLICATIONS

Office Action dated Nov. 7, 2014 received in U.S. Appl. No. 13/589,585.

* cited by examiner

AUTOMATED, CONTROLLED DISTRIBUTION AND EXECUTION OF COMMANDS AND SCRIPTS

CROSS-REFERENCE TO RELATED APPLICATIONS

This application is a continuation of U.S. patent application Ser. No. 13/589,585 filed on Aug. 20, 2012, the entire contents of which are incorporated herein by reference.

FIELD

The present application relates generally to computer systems, and more particularly to administering and managing computers.

BACKGROUND

Large data centers need large numbers of system administrators to manage servers for the customers they serve. When managing large numbers of servers, a system administrator (SA) frequently needs to execute a command or pre-existing script on a large number of servers for any of a number of purposes, such as viewing diagnostic information or setting a configuration parameter. For an SA to log in to each server, copy a script to the server, execute it, and copy the results back to his workstation is a very tedious, time-consuming, and error-prone job.

Server management frameworks have been developed to ease the distribution and execution of commands and scripts, but they lack access controls or a unified user interface for dispatching commands and collecting results.

BRIEF SUMMARY

A method of distributed execution of commands and scripts, in one aspect, may comprise receiving a selected executable object via a graphical user interface from a user. The method may further comprise receiving via the graphical user interface, a selected one or more managed computers on which to execute the selected executable object. The method may also comprise determining whether the user is authorized to execute the selected executable object on the selected one or more managed computers. The method may further comprise, in response to determining that the user is authorized to execute the selected executable object, communicating to the selected one or more managed computers to execute the executable object and dynamically collating results from the execution of the executable object on all of the selected one or more managed computers. The method may also comprise, in response to determining that the user is not authorized to execute the selected executable object, presenting an alert to the user via the graphical user interface.

A method of distributed execution of commands and scripts, in another aspect, may comprise receiving a selected executable object via a graphical user interface from a user. The method may also comprise receiving via the graphical user interface, a selected one or more managed computers on which to execute the selected executable object. The method may further comprise determining whether the user is authorized to execute the selected executable object on the selected one or more managed computers. The method may also comprise, in response to determining that the user is authorized to execute the selected executable object, determining whether the selected executable object has a parameter file and in response to determining that the selected executable object has a parameter file, allowing a user to customize the parameter file, and communicating to the selected one or more managed computers to execute the executable object with the customized parameter file, and dynamically collating results from the execution of the executable object on all of the selected one or more managed computers. The method may further comprise, in response to determining that the user is not authorized to execute the selected executable object, presenting an alert to the user via the graphical user interface.

A system of distributed execution of commands and scripts, in one aspect, may comprise a script execution manager having access to a library of executable objects comprising at least one or more of commands or scripts or combination of commands and scripts. A script execution console may be operable to present a graphical user interface for selecting an executable object from the library to execute and for selecting one or more managed computers, on which to execute the selected executable object. The script execution console may be further operable to present a dynamically updated collation of results from execution of the selected executable object. One or more script execution agents may be operable to run on the selected respective one or more managed computers and further operable to communicate with the script execution manager.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Automating and controlling of the distribution and execution of commands and scripts on multiple computer systems are presented. In one embodiment of the present disclosure, a graphical user interface is provided that includes a command line interface to multiple servers and present collated results from all servers. In another embodiment of the present disclosure, a platform-independent command line interface to multiple servers of different platforms with automatic translation of commands to platform-specific commands may be provided. Yet in another embodiment of the present disclosure, validation against white list may be provided, e.g., to prevent execution of potentially damaging commands/scripts. Still yet, role-specific and account-specific white lists may be provided, e.g., to restrict allowed commands/scripts to authorized users. Further, a temporary role may be automatically assigned to a user working on a service request granting privileges to execute role-specific white listed commands/scripts, based on information specified in the service request.

In one aspect, a graphical user interface of the present disclosure may include a command line field, displays endpoints applicable to the selected platform, let a user select endpoints for command execution, validate commands allowed to be executed on endpoints, collect and display execution results from multiple endpoints in one screen, and/or enable a user to save execution results to a single file on local workstation.

In the present disclosure, the term "script" is meant to include any executable program, e.g., a native operating system (OS) script, shell script, or binary executable program or the like. The term "command" is meant to include any native OS or shell command or the like. The term "executable object" refers to any one or more of script or command or any other entity that can be executed or run on a processor or the like.

Figure 1:
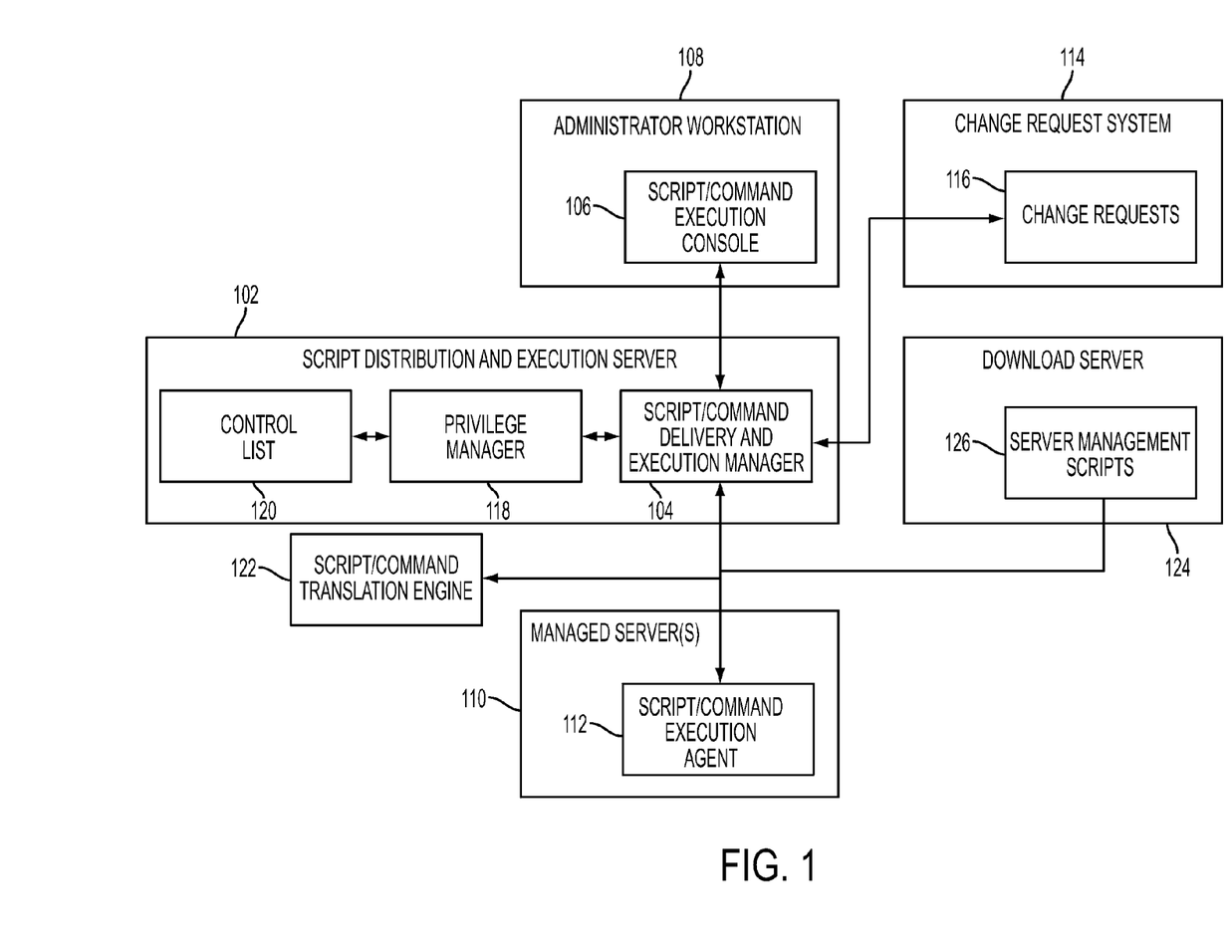
FIG. 1 illustrates system components of the present disclosure in one embodiment.

FIG. 1 illustrates system components of the present disclosure in one embodiment. The components shown in the figure may execute on hardware processors or computers. A script distribution and execution server 102 comprises a script/command delivery and execution manager (also referred to as a script execution manager) 104. The script execution manager 104 receives requests from a script/command execution console (also referred to as a script execution console) 106 running on a computer, for example, a system administrator's workstation 108. A script execution manager 104 may contain or have access to a library of executable objects, for example, one or more of commands or scripts or combination of commands and scripts. A script execution console 106 presents a graphical user interface for selecting an executable object (e.g., a command or script) from the library to execute and for selecting one or more managed computers 110, on which to execute the selected executable object. One or more script execution agents 112 may run on respective one or more managed computers 110 and communicate with the script execution manager 104. The script execution console 106 may further present a dynamically updated collation of results from execution of the selected executable object.

In one embodiment, the SA is notified of a service request, and enters the service request ticket ID into the script execution manager 104. The script execution manager queries the service request system 114 to retrieve details of the service request 116. In this scenario, the work to be done by the SA is prompted by a service request. A service request is a collection of information about a task that the SA is to perform on one or more computers. The service request can be originated by any of a number of persons or systems, e.g., the customer or another System Administrator, and typically has to be approved by the customer and possibly an account focal point. There can be standard types of service requests, for example, to delete a user ID. An example of a service request to remove a user ID would specify the Account, the User ID, and the computers from which that ID should be deleted. A standard service request type may be mapped to one or more SA roles, each of which may be mapped to one or more commands/scripts. For such a service request type, the system could temporarily grant the mapped role(s) to an SA for the purpose of executing the service request. Granting this role would enable the SA to execute only the commands/scripts mapped to that role. In another embodiment, the system could temporarily grant the SA permission to execute a set of mapped commands/scripts for the purpose of performing the service request (without granting a role). If the service request system 114 is not integrated with the script/command execution manager, then the SA would read the service request details, such as the account, service request type, the list of computers, and user, for example, directly from the service request system and enter them into the script execution console. The script/command execution manager would then look up the roles for which the SA user is to be authorized based on the service request type. In another embodiment, the script/command execution manager would look up the set of scripts/commands mapped to the service request type.

In one embodiment, the script execution manager 104 may consult with a privilege manager component 118, which finds a control list 120 that corresponds to the account and roles. For instance, the script execution console 106 via the script execution manager 104 may validate the selected executable object against a white list of allowed executable objects or a black list of disallowed executable objects, shown as control list 120. The script execution manager 104 also may communicate with the privilege manager 118 to validate the selected executable object against a list of executable objects specific to a role of a user, also shown as a control list 120.

In one embodiment, the list of executable objects comprising the control list for each service request type may be automatically generated by analyzing prior service requests of said each service type and collecting the executable objects used to complete said prior service requests.

In one embodiment, the script execution manager 104 may use a distributed server management framework to pass the name or identifier of the selected executable object (e.g., command or script) or the like to the selected manager server (targeted server endpoints).

In one embodiment, the script execution manager 104 may invoke a script/command translation engine 122, if a translation of the command to the platform of a targeted server is required. For instance, the script execution console 106 via the script execution manager 104 may automatically map the selected executable object into a platform specific executable object compatible or appropriate to execute on the selected one or more managed computers.

A script execution agent 112 running on each targeted endpoint or selected managed computer 110 executes the selected executable object (e.g., the command or script) on the selected managed computer 112. In case the executable object does not exist on the selected managed computer 110, for example if a script does not exist, the executable object may be downloaded from a download server 124, which holds a repository of server management executable objects 126, e.g., scripts.

In one embodiment, the script execution agent (e.g., 112) may check for existence of the selected executable object on the selected one or more managed computers (e.g., 110), and in response to determining that the selected executable object exists, the script execution agent 112 may compare a digital signature of the executable object with an approved digital signature associated with the executable object. The approved digital signature, for instance, may be the digital signature of the previously approved executable object having the same name or other identifier. In response to determining that the digital signature matches with the approved digital signature, the script execution agent 112 may execute the selected executable object. In response to determining that the digital signature does not match with the approved digital signature, the script execution agent 112 may download a version of the executable object from an approved server (e.g., 124) and execute the downloaded version of the executable object.

Following execution of the script/command on each endpoint, e.g., the selected executable object on the selected one or more managed computers, the result of the execution may be returned through the distributed server management framework to the script execution console 106, for instance, for presentation to the SA user. The script execution console 106 may aggregate or collate the results from all the target server endpoints, e.g., the selected one or more managed computers, and provide the user a choice of ways in which to view the consolidated results.

Figure 2:
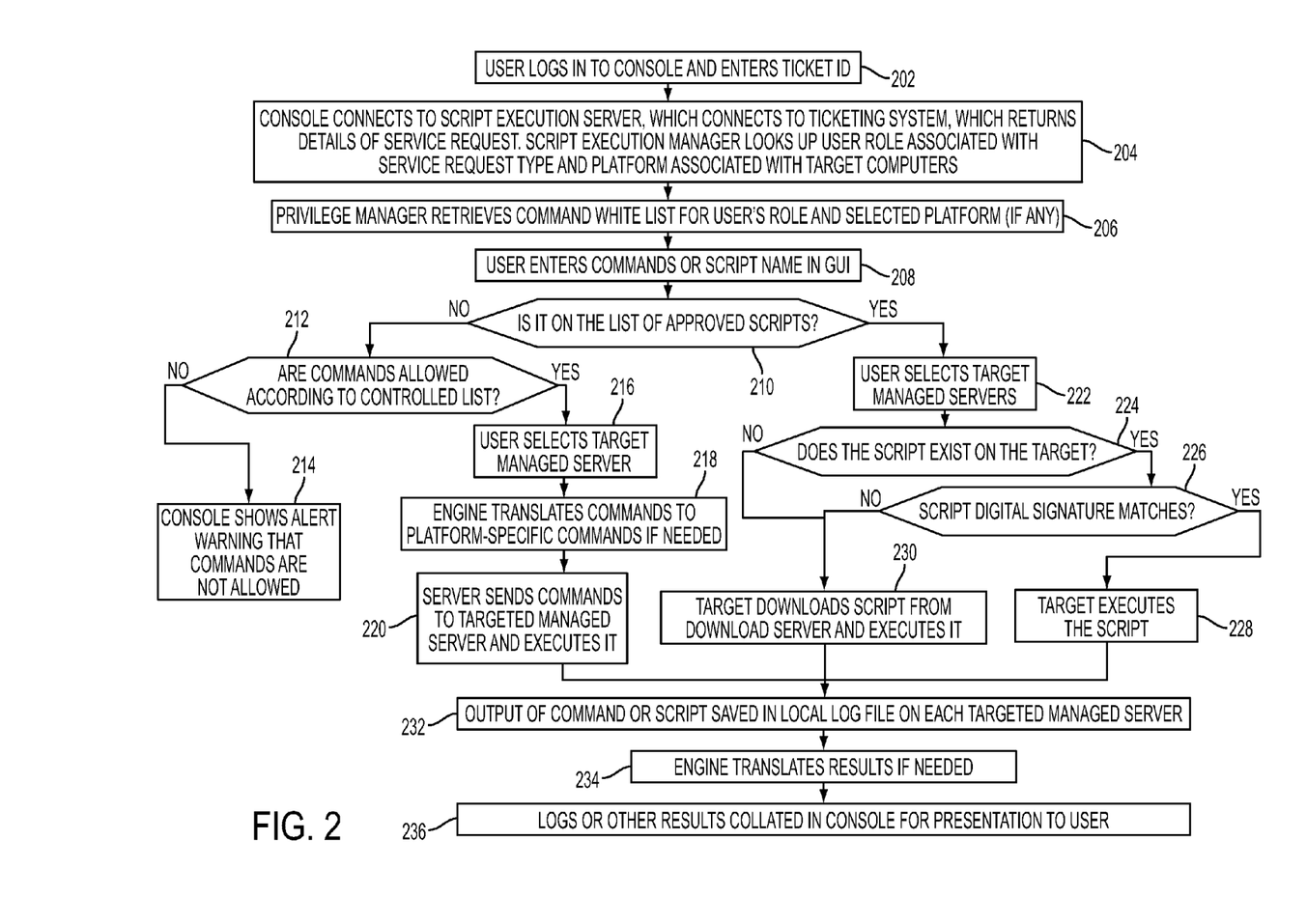
FIG. 2 is a flow diagram illustrating a method of controlled distribution and execution of commands in one embodiment of the present disclosure.

FIG. 2 is a flow diagram illustrating a method of controlled distribution and execution of commands in one embodiment of the present disclosure. At 202, a user logs into the script execution console and enters the ticket ID. At 204, the console connects to the script execution server, which optionally queries the service request system (ticketing system), passing in the ticket ID and returning the account ID, user role(s), and target endpoints with platform type. If there is no integration with the ticketing system, then the command request includes the account ID and user, and the script execution server looks up the user's role(s) from the privilege manager. If there are multiple platforms, a user may select one platform at a time, or use a translation feature, if available. The translation feature translates a selected script (or executable object) into an object that is compatible to run on a different platform.

The script execution server may invoke the privilege manager with the account and role information. At 206, the privilege manager looks up the control list (black or white) for the platform corresponding to each target server endpoint, aggregating the lists from multiple roles and restricting based on account.

At 208, the user enters the name of an executable object (e.g., a command or script) in the user interface. The script execution server checks the user-selected executable object (e.g., a command or script) against the list returned by the privilege manager. For example, it is determined at 210 whether the selected executable object is on the list of approved scripts, and if not at 212 whether the selected executable object is an allowed command according to the control list. If it is a disallowed command, the console shows an alert at 214. On the other hand, if the command is an allowed command according to the control list, at 216, the user may select one or more target managed servers (one or more managed computers).

At 218, the command may be translated to platform-specific command of the selected one or more managed computers, so that the command (or a compatible form of the command) can be executed on the selected one or more managed computers. For example, if command translation (optional) is used, then the collection of targeted servers could be of different OS platforms, and the script/command translation engine may translate the command to the appropriate platform for each target server. Command translation may not be used in all cases for any of the following reasons: it is a feature that was not purchased, it does not accurately translate to all platforms, or the selected computers are all of the same platform. At 220, the command is sent to the selected one or more managed computers, and the logic of the method proceeds to 232. In one embodiment of the present disclosure, commands are assumed to exist on each target server, e.g., as built into the operating system or native shell. "Sending" the command here sends the name of the command (possibly including parameters) to the agent on the target computer, and instructing the agent to execute the command. For example, the command is sent to the script/command execution agent on each endpoint, and executed.

At 210, if it is determined that the selected executable object is on a list of approved executable objects (e.g., a list of approved scripts), at 222, the user may select one or more managed computers. The following elements 224, 226, 228 and 230 may be performed for each of the selected managed computers. At 224, it is determined whether the executable object (e.g., a script) exists on the selected managed computer. If the executable object does not exist on the selected managed computers, the logic of the method proceeds to 230. If the executable object exists on the selected managed computer, at 226, it is determined whether the digital signature of the executable object existing on the selected managed computer matches a digital signature of an approved version of the executable object. If so, the executable object is executed on the selected managed computer. If the digital signature of the executable object existing on the selected managed computer does not match a digital signature of an approved version of the executable object, the logic proceeds to 230. At 230, e.g., if the executable object did not exist on the selected computer or if the existing executable object on the selected computer did not have a matching digital signal of an approved one, the selected executable object is downloaded, e.g., from a source that has the approved version, e.g., a server that maintains approved versions.

For example, if the user has selected a script that is in the allowed list, then the agent running on each endpoint checks to see whether the script already has been previously downloaded to the endpoint. If not, it downloads it from the appropriate download server and executes it. If the script already exists on the endpoint, the agent computes its digital signature and compares it with the digital signature passed in with the request to execute the script. If they do not match, then there is the possibility that the script on the endpoint is an old version or that it has been modified without authorization, in which case the agent downloads the official latest version from the server. If the digital signatures match, then the agent executes the script.

At 232, output of the executable object (e.g., command or script) is redirected to a log file on each endpoint, and copied to the script distribution and execution server by the framework. At 234, any platform-dependent translation of results may be performed by a translation engine or the like. At 236, the results are presented to the user, e.g., in the script/command execution console in an aggregated display.

Figure 3:
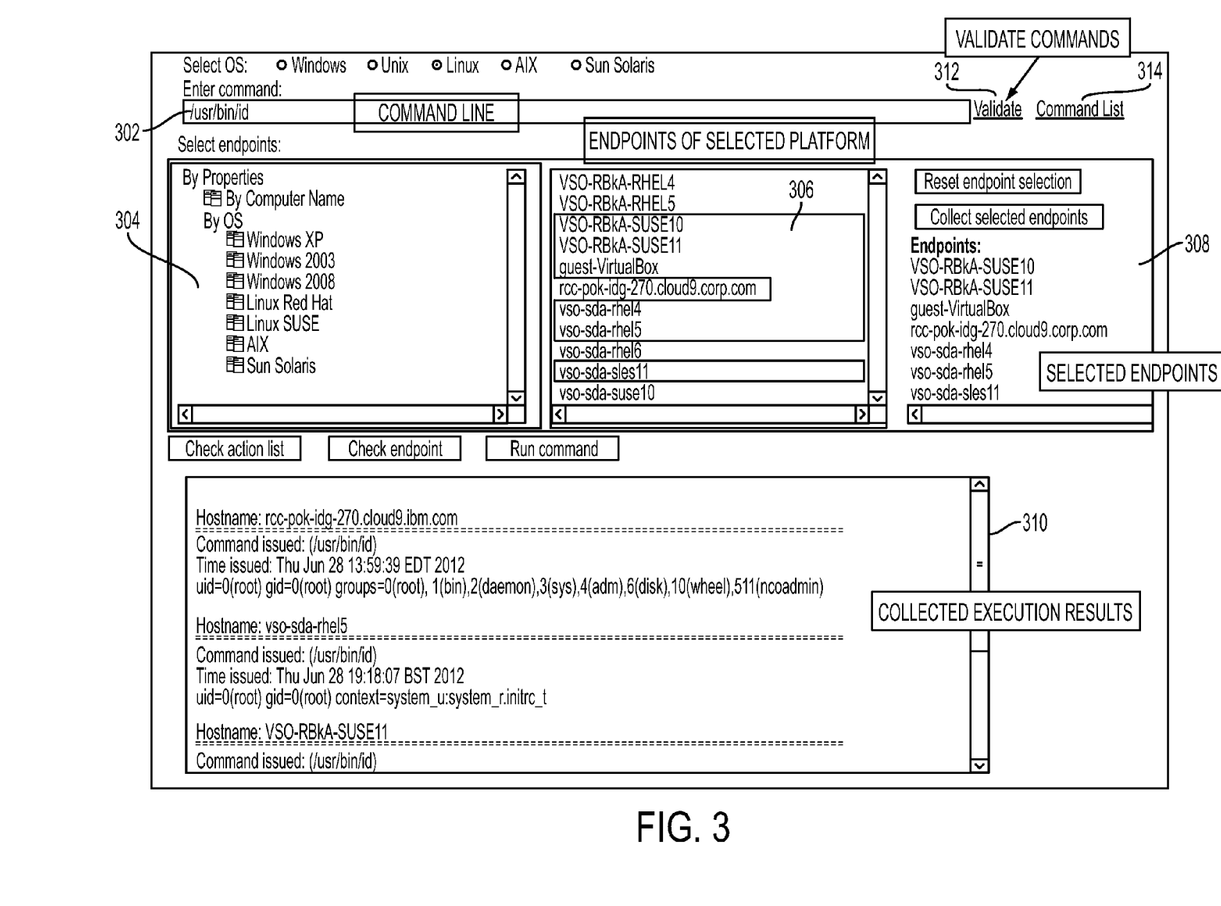
FIG. 3 is an example screen shot of a graphical user interface that shows command line field in one embodiment of the present disclosure.

FIG. 3 is an example screen shot of a graphical user interface that shows command line field in one embodiment of the present disclosure. The graphical user interface may include a window or the like display with a field 302 for entering a name or identifier of an executable object such as a command or script. The graphical user interface may also comprise a display of endpoint platforms 304, endpoints of selected platform 306, selected endpoints 308 and collected execution results 310. For instance, a user may enter via the graphical user interface command line field 302, an executable object. The user may also select a desired platform via the selection menu or another mechanism as shown at 304. The graphical user interface may display or otherwise present the endpoints of the selected platform, for example as shown at 306. The user may select one or more desired endpoints (also referred to as managed computers) via the panel at 306. The selected endpoints are shown at 308, e.g., via another display panel or the like. The results of the command executed on the selected endpoints, e.g., shown at 308, are displayed or presented at 310. The graphical user interface may also include a button or the like for invoking validation of the entered executable object, e.g., as shown at 312. A command list button or the like element 314 may invoke a presentation or display of a command list.

Figure 4:
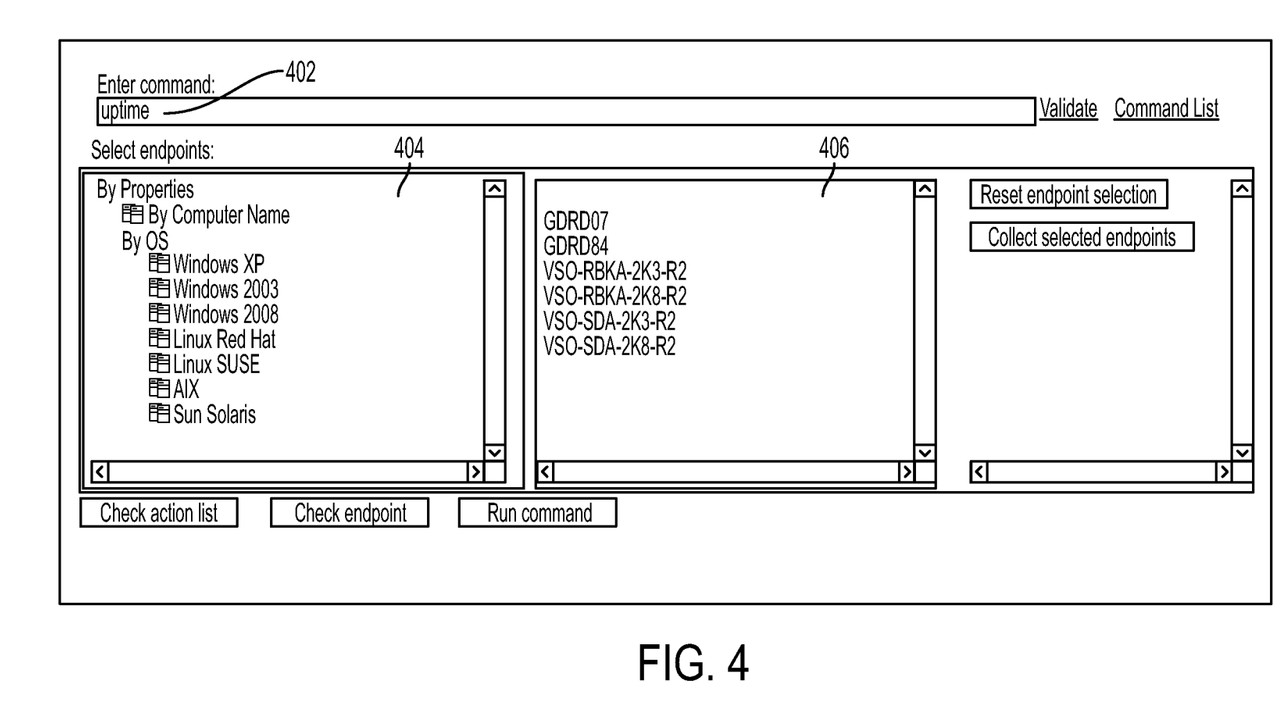
FIG. 4 is an example screen shot of a graphical user interface that shows translation of commands to equivalent commands for platforms in one embodiment of the present disclosure.

FIG. 4 is an example screen shot of a graphical interface that shows translation of commands to equivalent commands for other platforms in one embodiment of the present disclosure. For instance, a user may enter command in native shell language of one platform and select endpoints of multiple platforms. The methodology of the present disclosure in one embodiment retrieves equivalent commands in shell languages of other platforms and passes a command of appropriate shell language to each endpoint. For instance, a user may enter 'uptime' Linux™ operating system command as shown at 402. The user selects Linux™ and Windows™ target servers from 404. At 406, the servers or computers running those platforms are presented. The methodology of the present disclosure in one embodiment may automatically translate the 'uptime' command into an equivalent function in Windows™ operating system, e.g., 'net stats srv'. According to the methodology of the present disclosure, 'uptime' command is executed on Linux and 'net stats srv' command is executed on Windows™ servers.

Figure 5:
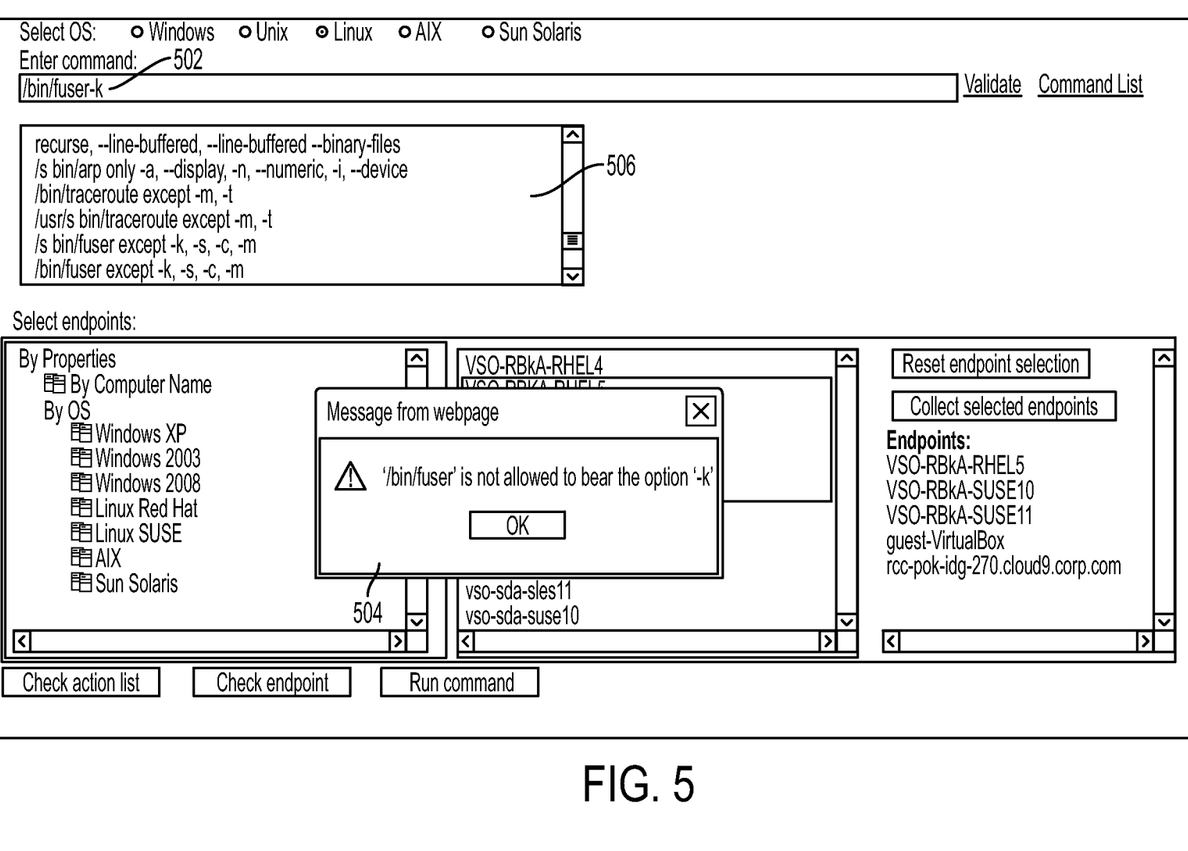
FIG. 5 is an example screen shot of a graphical user interface that shows validation of commands against a list of allowed or forbidden commands in one embodiment of the present disclosure.

FIG. 5 is an example screen shot of a graphical interface that shows validation of commands against a list of allowed or forbidden commands in one embodiment of the present disclosure. In one embodiment of the present disclosure, a white list of allowed commands, e.g., including allowed options and/or a black list of forbidden commands may be defined. An entered executable object (e.g., command) 502 may be parsed, e.g., via string or text parsing (e.g., including concatenated or piped commands). Each command may be validated against the list. The list may also be shown, e.g., as at 506. The methodology of the present disclosure may prevent execution of commands in the black list or not in the white list, e.g., as shown at 504.

Figure 6:
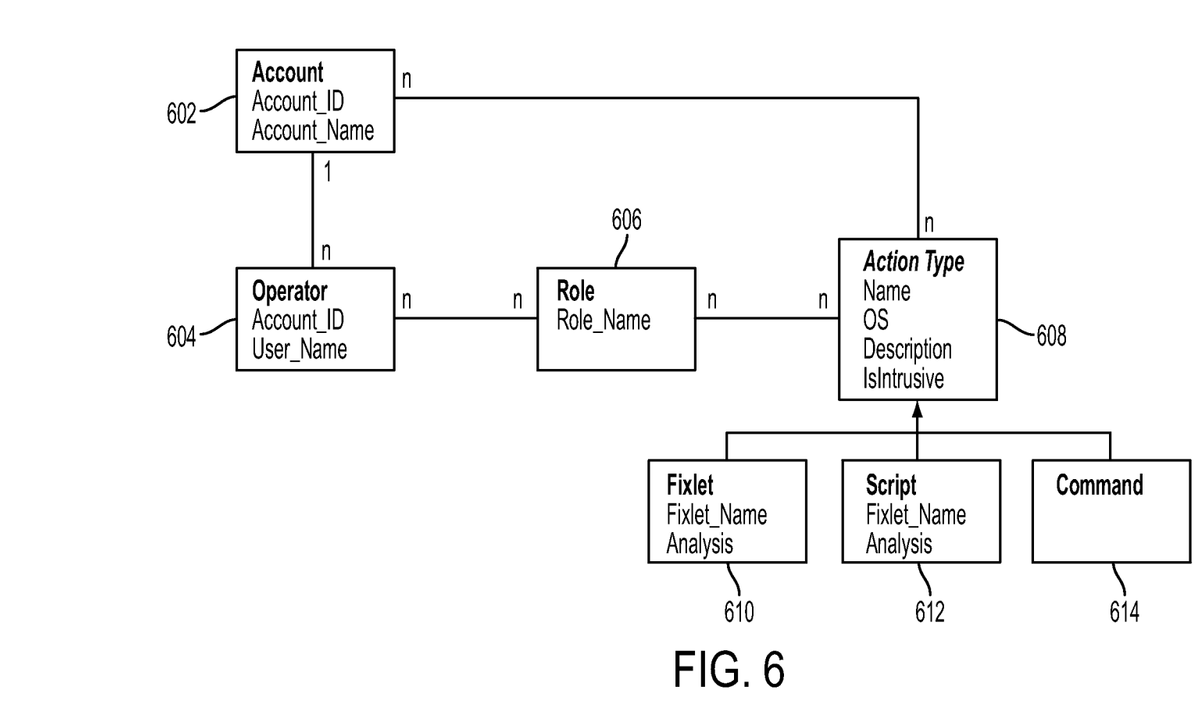
FIG. 6 is a diagram showing role-specific control lists for controlling authorized users in executing commands in one embodiment of the present disclosure.

FIG. 6 is a class diagram showing role-specific control lists for controlling authorized users in executing commands in one embodiment of the present disclosure. In one embodiment of the present disclosure, a role-specific control list restricts commands (or another executable object) to authorized users. For example, a role or roles of a user may be defined such as system administrator, database administrator, level-1 support, and others. For each role, a black list or a white list containing commands or the like that the role may not or may execute may be defined or generated. For instance, the black list would contain a list of commands (or another like executable) that the associated role may not execute; a white list would contain a list of commands (or another like executable) that the associated role may execute. If using a white list then any command in the white list is allowed and any command not in the white list is forbidden. If using a black list, then any command in the black list is forbidden and any command not in the black list is allowed.

User-entered commands may be validated based on the list corresponding to user role. In one embodiment, multi-tenancy through account-specific white or black lists may be enabled. Referring to FIG. 6, account element 602 identifies a customer for whom the servers are being managed. An operator element 604 identifies a System Administrator or the like who is authorized to work on an account. One or more operators may be assigned to work on an account, but in one embodiment each operator can work on only one account. A role element 606 is the name of a role for which the operator is authorized. Each role has permission to perform certain action types. An action type element 608 is an abstract class that has one of the subclass types: fixlet element 610, script element 612, or command element 614. The action types authorized for each role may be restricted based on the preferences of each account. The fixlet element 610 represents a code object that conforms to the distributed server management framework specifications, and that can therefore be executed directly by the framework. For example, IBM® Tivoli Endpoint Manager specifies how to create fixlets that can be executed by the Tivoli Endpoint Manager framework. The script element 612 represents an operating system or shell script that can be directly executed on a command line of a target computer of the corresponding platform. The command element 614 represents an operating system or shell command of a computer platform. Referring to the class diagram of FIG. 6, the control lists comprise lists of Action Types (fixlets, scripts, and/or commands). Each control list can be associated with one or more Roles, and can be restricted for each Account. The Operators assigned to an Account are authorized to perform those Action Types for which they have a required Role. Not shown in the diagram is an association of Computers to Accounts, which governs the possible target computers for the operator's actions.

Figure 7:
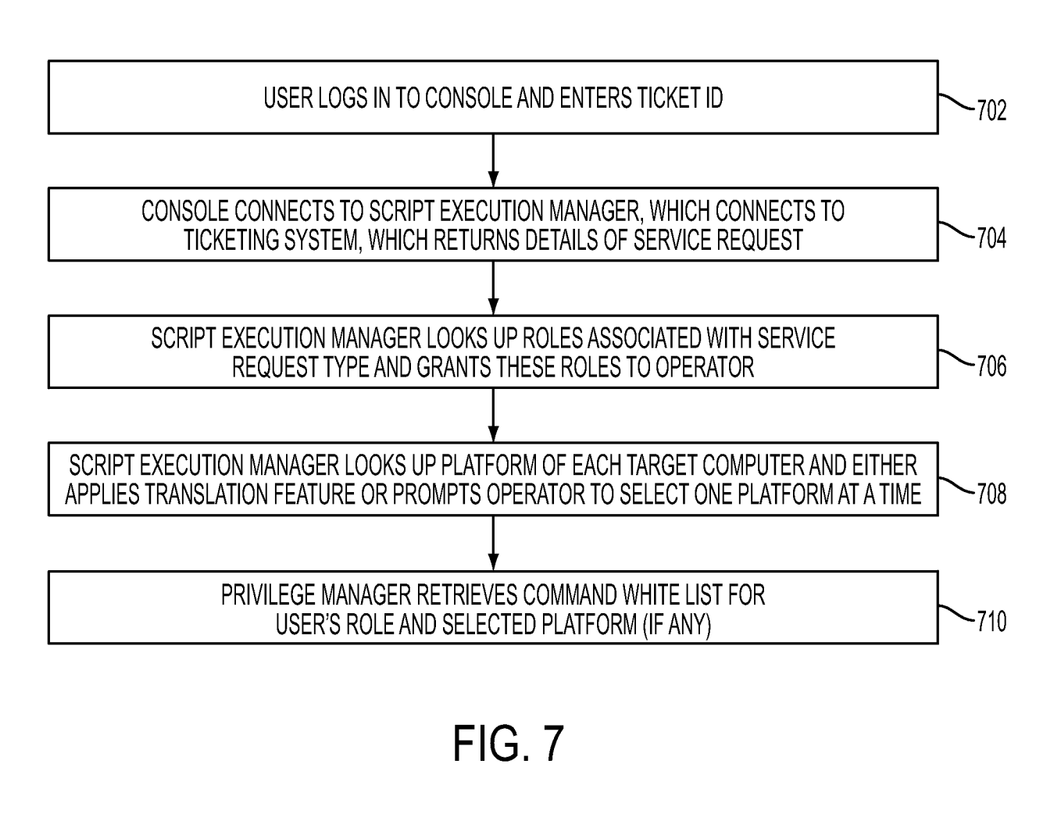
FIG. 7 is a flow diagram illustrating assigning a role based on service request.

FIG. 7 is a flow diagram illustrating assigning a role based on service request. At 702, a user may log on to a workstation console and enter a service request ticket ID. At 704, the console connects to a script execution server, which connects to a ticketing system, which returns the details of the service request, such as the service request type, the account, and the target computers. At 706, the script execution manager looks up the roles associated with the service request type and grants these role(s) to the operator. At 708, the script execution manager also looks up the platform of each target computer and either applies the translation feature or prompts the operator to select one platform at a time. At 710, a privilege manager or the like functionality retrieves a command white list for the user's role and selected platform (if any).

Figure 8:
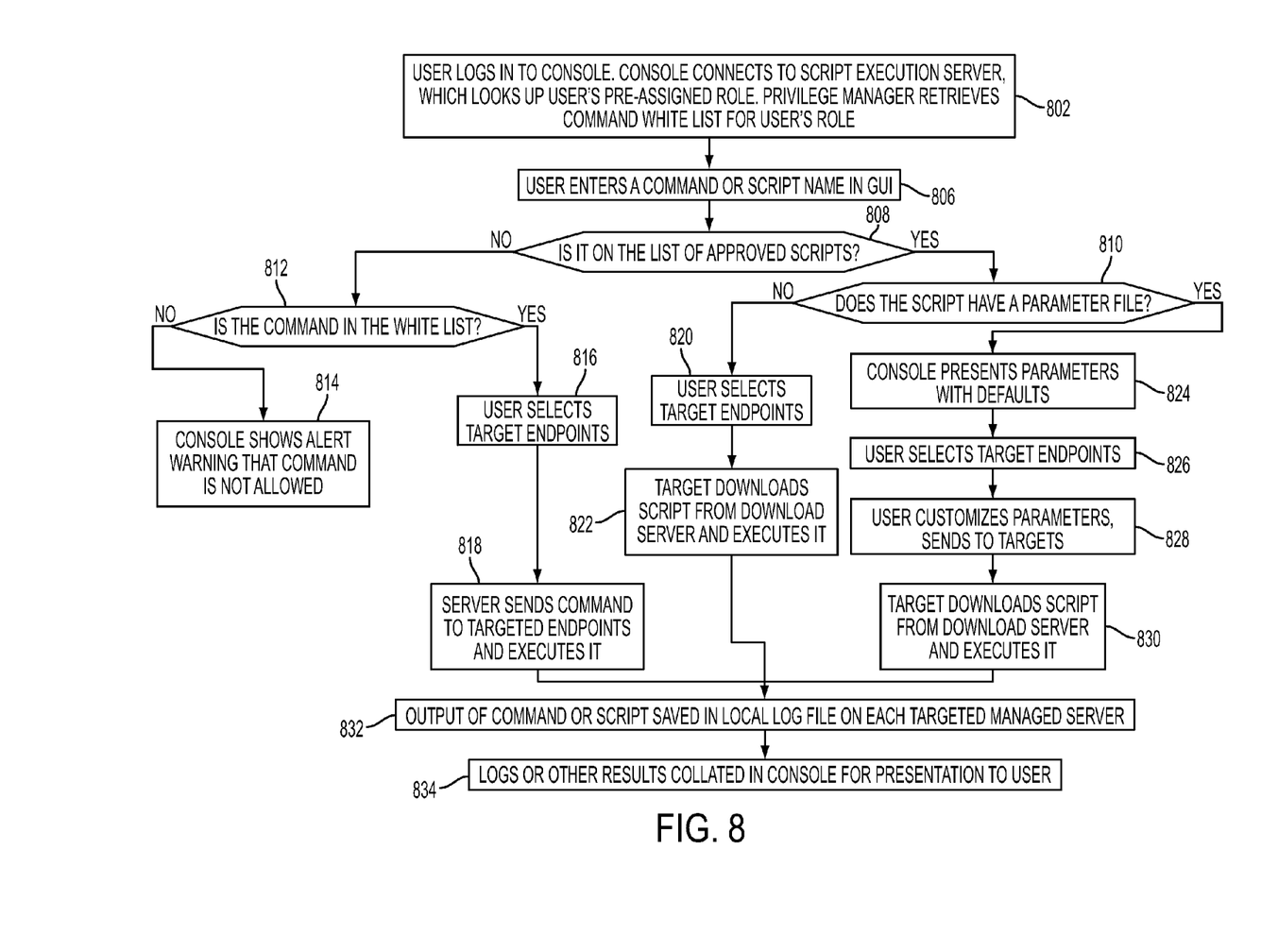
FIG. 8 is a flow diagram illustrating a method of controlled distribution and execution of commands in another embodiment of the present disclosure.

FIG. 8 is a flow diagram illustrating a method of controlled distribution and execution of commands in another embodiment of the present disclosure. At 802, a user logs into the script execution console and the console connects to a script execution server, which looks up user's pre-assigned role. A privilege manager retrieves a command white list for user's role. At 806, the use enters a command or script (or another executable object), e.g., via a GUI. At 808, the script execution server checks the user-selected executable object (e.g., a command or script) against the white list. For example, it is determined at 808 whether the selected executable object is on the list of approved scripts, and if not at 812 whether the selected executable object is an allowed command according to the white list. If it is a disallowed command, the console shows an alert at 814. On the other hand, if the command is an allowed command according to, at 816, the user may select one or more target manager server (one or more managed computers).

At 818, the command is sent to the selected one or more managed computers, and the logic of the method proceeds to 832. For example, the command is sent to the script/command execution agent on each endpoint, and executed.

At 810, if it is determined whether the entered script has a parameter file. This may be determined, e.g., by checking a configuration file that contains the name of each script and the name of the corresponding parameter file (if any). Parameter file may contain input parameters or the like for executing the script. If so, at 824, the console presents the operator with an input window for each parameter pre-populated with a default value. At 826, the user may select one or more target endpoints (one or more managed computers or servers). At 828, the user customizes the parameters, and the customized parameters are sent to the selected target endpoints. At 830, the one or more selected target endpoints download the entered script and execute it.

At 820, if the entered script does not have a parameter file, the user is enabled to select one or more target endpoints. At 822, the one or more selected target endpoints download the entered script and execute it.

At 832, output of the executable object (e.g., entered command or script) may be saved in local log file on each targeted managed server. At 834, logs or other results are collated in the console for presentation to user.

In one embodiment of the present disclosure, summarization of results and/or special execution-conditions may be presented by integration of output from all servers or computers that are managed. The methodology of the present disclosure may provide improved usability, for example, in that a user may detect error condition with less effort, thus providing for smaller likelihood to miss abnormal erroneous execution that can cause subsequent errors. One embodiment of the present disclosure may provide for an automated generation of reports that integrate across individual server executions. Output methods that are introduced in the script itself may not be able to separate error message from (valid/result) content. Such output methods in the script also may not be able to integrate across multiple servers, such as multiple servers on which a Web application archive (WAR) is deployed in a Web application server (WAS) cluster.

In one embodiment of the present disclosure, at script selection/input time, a user has the option to identify one or more output processing options. For instance, one output processing option is to summarize output results in a report to be forwarded to the customer, and another option is to extract relevant warning and error messages to ensure the user is made aware of relevant error conditions.

In one embodiment of the present disclosure, the output processing method is specified by a script or command (e.g., awk command line, cshell script with sequence of text processing commands such as sort and awk) capable of receiving input from stdin and write to stdout. The method can be bundled with the command script, can be selected from a library attached to the graphical user interface (GUI), or can be loaded specifically by the user. At execution time, the GUI in one embodiment of the present disclosure presents the "raw" (unprocessed) output as per the specific conditions selected by the user (e.g., separated by server or merged in order of arrival at GUI server). The GUI also may present the result of each output processing options.

In one embodiment of the present disclosure, at completion time, the user has the option to view the complete result of the output processing option, and send to one or more outlets, store in dedicated file, email, append to existing file. The methodology of the present disclosure in one embodiment may reduce the cost of administering servers.

The one or more components of the present disclosure, for example, shown in FIG. 1, may be implemented on one or more computer or processing systems. Such computer or processing system may be operational with numerous other general purpose or special purpose computing system environments or configurations. Examples of well-known computing systems, environments, and/or configurations that may be suitable for use with the methodology of the present disclosure may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units, a system memory, and a bus that couples various system components including system memory to processor. The processor may include one or more controlled distribution and command execution components that perform the methods described herein. The module may be programmed into the integrated circuits of the processor, or loaded from memory, storage device, or network or combinations thereof.

Bus may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory can include computer system readable media in the form of volatile memory, such as random access memory (RAM) and/or cache memory or others. Computer system may further include other removable/non-removable, volatile/non-volatile computer system storage media. By way of example only, storage system can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus by one or more data media interfaces.

Computer system may also communicate with one or more external devices such as a keyboard, a pointing device, a display, etc.; one or more devices that enable a user to interact with computer system; and/or any devices (e.g., network card, modem, etc.) that enable computer system to communicate with one or more other computing devices. Such communication can occur via Input/Output (I/O) interfaces.

Still yet, computer system can communicate with one or more networks such as a local area network (LAN), a general wide area network (WAN), and/or a public network (e.g., the Internet) via network adapter. As depicted, network adapter communicates with the other components of computer system via bus. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A system of distributed execution of commands and scripts, comprising:

a script execution manager having access to a library of executable objects comprising at least one or more of commands or scripts or combination of commands and scripts;

a script execution console operable to present a graphical user interface for selecting an executable object from the library to execute and for selecting one or more managed computers, on which to execute the selected executable object, the script execution console further operable to present a dynamically updated collation of results from execution of the selected executable object;

one or more script execution agents operable to run on the selected respective one or more managed computers and further operable to communicate with the script execution manager; and a hardware processor operable to execute the script execution manager and the script execution console, wherein the graphical user interface comprises a command line field for entering an identifier of the one or more of commands or scripts, a menu of operating system platforms from which to select, wherein the one or more managed computers are automatically selected based on a selection from the menu of operating system platforms, and a results window that presents the dynamically updated collation of results, the command line field, the menu of operating system platforms, and the results window presented in one screen, the script execution manager further operable to assign a temporary role for determining which list of executable objects to use to validate the selected executable object.

2. The system of claim 1, wherein the script execution console is further operable to automatically map the selected executable object into a platform specific executable object compatible to execute on the selected one or more managed computers.

3. The system of claim 2, further comprising a translation engine operable to translate the selected executable object into the platform specific executable object.

4. The system of claim 2, wherein the script execution agent is further operable to check for existence of the selected executable object on the selected one or more managed computers, and in response to determining that the selected executable object exists, the script execution agent is further operable to compare a digital signature of the executable object with an approved digital signature associated with the executable object, and in response to determining that the digital signature matches with the approved digital signature, the script execution agent is further operable to execute the selected executable object, and in response to determining that the digital signature does not match with the approved digital signature, the script execution agent is further operable to download a version of the executable object from an approved server and execute the downloaded version of the executable object.

5. The system of claim 1, wherein the script execution console is further operable to validate the selected executable object against a list of executable objects.

6. The system of claim 1, further comprising a privilege manager operable to validate the selected executable object against a list of executable objects specific to a role of a user.

7. The system of claim 1, further comprising a service request system that contains service request information accessed by the script execution manager to assign the temporary role.

8. The system of claim 7, wherein the list of executable objects for each service request type is automatically generated by analyzing prior service requests of said each service type and collecting the executable objects used to complete said prior service requests.

9. The system of claim 1, wherein the executable object is a script.

10. The system of claim 1, wherein the executable object is a command.

11. A non-transitory computer readable storage medium storing a program of instructions executable by a machine to perform a method of distributed execution of commands and scripts, comprising:

receiving a selected executable object via a graphical user interface from a user;

receiving via the graphical user interface, a selected one or more managed computers on which to execute the selected executable object;

determining whether the user is authorized to execute the selected executable object on the selected one or more managed computers;

in response to determining that the user is authorized to execute the selected executable object, communicating to the selected one or more managed computers to execute the executable object and dynamically collating results from the execution of the executable object on all of the selected one or more managed computers; and in response to determining that the user is not authorized to execute the selected executable object, presenting an alert to the user via the graphical user interface, wherein the graphical user interface presents at least a command line field for entering an identifier of the selected executable object, a menu of operating system platforms from which to select, wherein the one or more managed computers are automatically selected based on a selection from the menu of operating system platforms, and a results window that presents the dynamically collated results, the command line field, the menu of operating system platforms, and the results window presented in one screen, the method further comprising assigning a temporary role to the user, the temporary role determining which list of executable objects to use to validate the selected executable object.

12. The computer readable storage medium of claim 11, further comprising:

in response to determining that the user is authorized to execute the selected executable object, checking for existence of the selected executable object on the selected one or more managed computers, and in response to determining that the selected executable object exists, comparing a digital signature of the executable object with an approved digital signature associated with the executable object, and in response to determining that the digital signature matches with the approved digital signature, executing the selected executable object, and in response to determining that the digital signature does not match with the approved digital signature, downloading a version of the executable object from an approved server and executing the downloaded version of the executable object.

13. The computer readable storage medium of claim 11, further comprising:

automatically mapping the selected executable object into a platform specific executable object compatible to execute on the selected one or more managed computers.

14. The computer readable storage medium of claim 11, wherein the determining of whether the user is authorized to execute the selected executable object on the selected one or more managed computers comprises checking a control list containing allowable executable objects specific to a user role.

15. The computer readable storage medium of claim 11, wherein the determining of whether the user is authorized to execute the selected executable object on the selected one or more managed computers comprises checking a list containing executable objects said user is disallowed from executing.

16. The computer readable storage medium of claim 11, wherein the executable object is a script.

17. The computer readable storage medium of claim 11, wherein the executable object is a command.

18. The computer readable storage medium of claim 11, further comprising presenting via the graphical user interface the dynamically collated results.

19. A non-transitory computer readable storage medium storing a program of instructions executable by a machine to perform a method of distributed execution of commands and scripts, the method comprising:

receiving a selected executable object via a graphical user interface from a user;

receiving via the graphical user interface, a selected one or more managed computers on which to execute the selected executable object;

determining whether the user is authorized to execute the selected executable object on the selected one or more managed computers;

in response to determining that the user is authorized to execute the selected executable object, determining whether the selected executable object has a parameter file and in response to determining that the selected executable object has a parameter file, allowing a user to customize the parameter file, and communicating to the selected one or more managed computers to execute the executable object with the customized parameter file, and dynamically collating results from the execution of the executable object on all of the selected one or more managed computers; and in response to determining that the user is not authorized to execute the selected executable object, presenting an alert to the user via the graphical user interface, wherein the graphical user interface presents at least a command line field for entering an identifier of the selected executable object, a menu of operating system platforms from which to select, wherein the one or more managed computers are automatically selected based on a selection from the menu of operating system platforms, and a results window that presents the dynamically collated results, the command line field, the menu of operating system platforms, and the results window presented in one screen, the method further comprising assigning a temporary role to the user, the temporary role determining which list of executable objects to use to validate the selected executable object.

20. The computer readable storage medium of claim 19, further comprising:

in response to determining that the user is authorized to execute the selected executable object, checking for existence of the selected executable object on the selected one or more managed computers, and in response to determining that the selected executable object exists, comparing a digital signature of the executable object with an approved digital signature associated with the executable object, and in response to determining that the digital signature matches with the approved digital signature, executing the selected executable object, and in response to determining that the digital signature does not match with the approved digital signature, downloading a version of the executable object from an approved server and executing the downloaded version of the executable object.

21. The computer readable storage medium of claim 19, further comprising:

automatically mapping the selected executable object into a platform specific executable object compatible to execute on the selected one or more managed computers.

22. The computer readable storage medium of claim 19, wherein the determining of whether the user is authorized to execute the selected executable object on the selected one or more managed computers comprises checking a control list containing allowable executable objects specific to a user role.

* * * * *